US009484753B2

(12) United States Patent
Bui-Van et al.

(10) Patent No.: US 9,484,753 B2
(45) Date of Patent: Nov. 1, 2016

(54) METHOD FOR BALANCING THE CHARGE AND DISCHARGE LEVEL OF A BATTERY BY SWITCHING ITS BLOCKS OF CELLS

(71) Applicant: RENAULT s.a.s., Boulogne-Billancourt (FR)

(72) Inventors: Anh-Linh Bui-Van, Saint Nizier du Moucherotte (FR); Frederic Sauneuf, Velizy Villacoublay (FR); Pierre Perichon, Voiron (FR); Sebastien Carcouet, Vif (FR)

(73) Assignee: RENAULT S.A.S., Boulogne-Billancourt (FR)

( * ) Notice: Subject to any disclaimer, the term of this patent is extended or adjusted under 35 U.S.C. 154(b) by 226 days.

(21) Appl. No.: 14/354,360

(22) PCT Filed: Oct. 26, 2012

(86) PCT No.: PCT/FR2012/052470
§ 371 (c)(1),
(2) Date: Jul. 1, 2014

(87) PCT Pub. No.: WO2013/061001
PCT Pub. Date: May 2, 2013

(65) Prior Publication Data
US 2015/0288199 A1    Oct. 8, 2015

(30) Foreign Application Priority Data

Oct. 26, 2011 (FR) ..................................... 11 59732

(51) Int. Cl.
*H02J 7/00* (2006.01)
*H01M 10/44* (2006.01)
(Continued)

(52) U.S. Cl.
CPC ............ *H02J 7/0016* (2013.01); *B60L 3/0046* (2013.01); *B60L 3/04* (2013.01); *B60L 11/1809* (2013.01);
(Continued)

(58) Field of Classification Search
CPC . H02J 7/0016; H02J 7/0086; B60L 11/1809; B60L 11/1866

USPC .......................................................... 320/118
See application file for complete search history.

(56) References Cited

U.S. PATENT DOCUMENTS 4,390,763 A * 6/1983 Hruda .................. H01H 33/002
204/229.7
5,177,425 A * 1/1993 Goto .................... H01M 10/441
320/130

(Continued)

FOREIGN PATENT DOCUMENTS

DE   10 2009 007 294 A1   8/2010
FR       2 753 838 A1   3/1998

(Continued)

OTHER PUBLICATIONS

International Search Report issued May 27, 2014 in PCT/FR2012/052470 (with English language translation).

(Continued)

*Primary Examiner* — M'Baye Diao
(74) *Attorney, Agent, or Firm* — Oblon, McClelland, Maier & Neustadt, L.L.P.

(57) ABSTRACT

A device balancing overall levels of electrical charge in plural blocks of cells in a battery. The blocks can be connected in a circuit during a charging phase of the cells accumulating charge, and during a discharging phase of the cells giving back charge. The device includes one series switch and one parallel switch. The series switch can, when closed and the parallel switch is open, connect a block to the circuit, in series with the other blocks, so that the block is connected during the charging and discharging phases. The parallel switch can, when closed and the series switch is open, disconnect the block from the circuit, so that the block is disconnected if discharging disconnection conditions are met during the discharging phase or if charging disconnection conditions are met during the charging phase. The block includes a mechanism locally balancing charge levels of its cells when disconnected.

13 Claims, 9 Drawing Sheets

Figure 1:
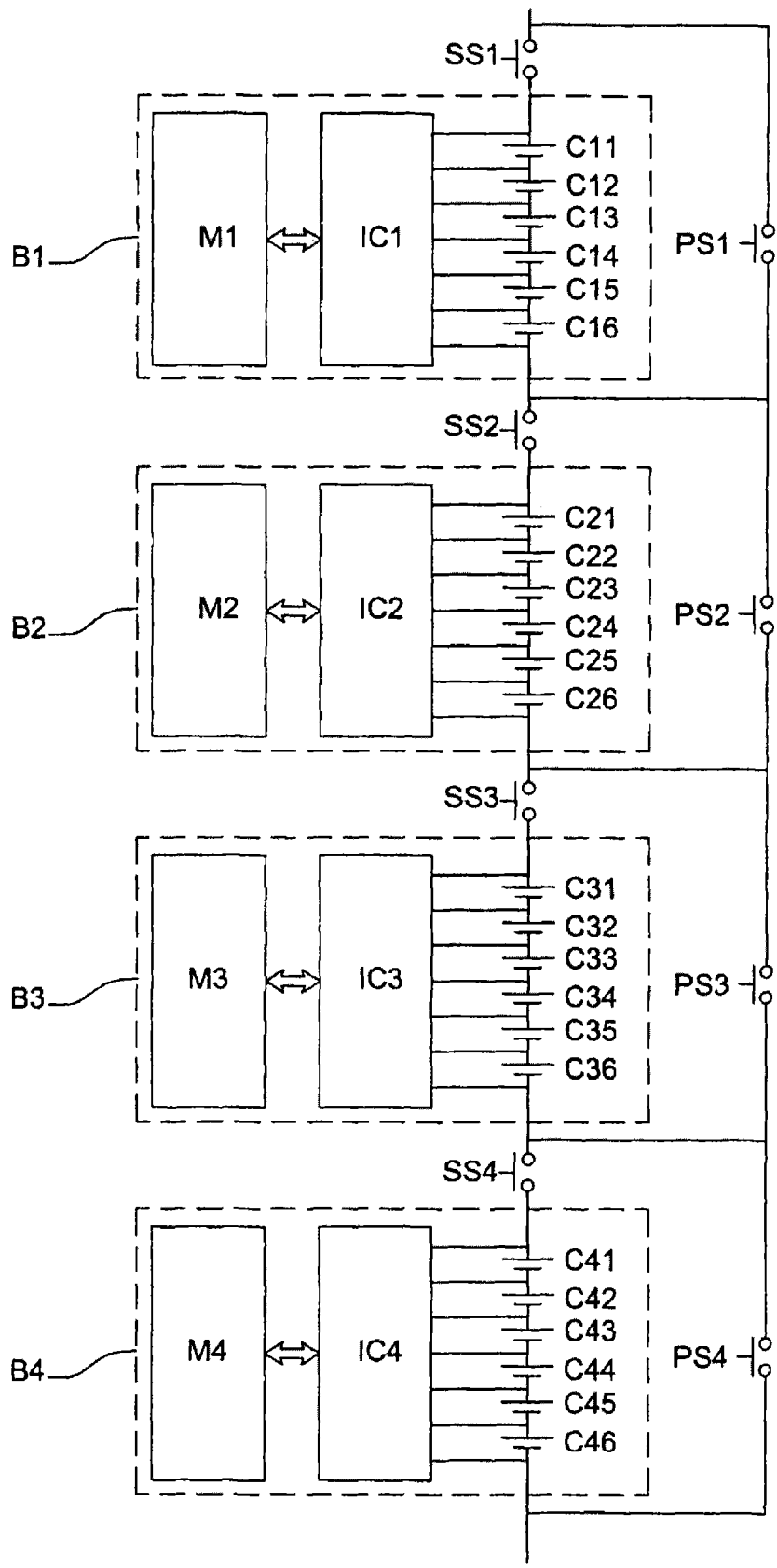

(51) Int. Cl.
*B60L 3/00* (2006.01)
*B60L 3/04* (2006.01)
*B60L 11/18* (2006.01)
*H01M 10/0525* (2010.01)
*H01M 10/48* (2006.01)
*H01M 10/42* (2006.01)

(52) U.S. Cl.
CPC ........ *B60L 11/1853* (2013.01); *B60L 11/1866* (2013.01); *H01M 10/441* (2013.01); *H02J 7/0086* (2013.01); *B60L 2240/545* (2013.01); *B60L 2240/547* (2013.01); *B60L 2240/549* (2013.01); *H01M 10/0525* (2013.01); *H01M 10/482* (2013.01); *H01M 2010/4271* (2013.01); *H01M 2220/20* (2013.01); *Y02T 10/7005* (2013.01); *Y02T 10/7011* (2013.01); *Y02T 10/7055* (2013.01); *Y02T 10/7061* (2013.01)

(56) References Cited

U.S. PATENT DOCUMENTS

| | | | |
|---|---|---|---|
| 5,670,861 A * | 9/1997 | Nor ...................... | B60L 11/185 307/10.7 |
| 6,034,506 A | 3/2000 | Hall | |
| 6,081,095 A * | 6/2000 | Tamura .............. | B60L 11/1861 320/118 |
| 6,150,795 A * | 11/2000 | Kutkut ................. | H02J 7/0018 320/118 |
| 6,430,692 B1 | 8/2002 | Kimble et al. | |
| 9,085,243 B2 * | 7/2015 | Chatroux .............. | B60L 3/0046 |
| 9,130,379 B2 * | 9/2015 | Sakabe ................. | B60L 3/0046 |
| 2004/0135544 A1 | 7/2004 | King et al. | |
| 2004/0135545 A1 | 7/2004 | Fowler et al. | |
| 2004/0135546 A1 | 7/2004 | Chertok et al. | |
| 2005/0023054 A1 | 2/2005 | Weidenheimer et al. | |
| 2006/0249318 A1 | 11/2006 | Weidenheimer et al. | |
| 2008/0191663 A1 | 8/2008 | Fowler et al. | |
| 2008/0211451 A1 | 9/2008 | Zhang et al. | |
| 2008/0211459 A1 | 9/2008 | Choi | |
| 2011/0001456 A1 | 1/2011 | Wang | |
| 2011/0057617 A1 | 3/2011 | Finberg et al. | |
| 2012/0161524 A1 | 6/2012 | Weidenheimer et al. | |
| 2014/0070607 A1 | 3/2014 | Weidenheimer et al. | |
| 2014/0152261 A1 * | 6/2014 | Yamauchi .......... | B60L 11/1866 320/118 |
| 2014/0159650 A1 * | 6/2014 | Beauregard .......... | H02J 7/0024 320/107 |

FOREIGN PATENT DOCUMENTS

| | | |
|---|---|---|
| JP | 2004-015924 A | 1/2004 |
| JP | 2008-288109 A | 11/2008 |
| WO | WO 2004/049540 A2 | 6/2004 |
| WO | WO 2011/025937 A2 | 3/2011 |

OTHER PUBLICATIONS

French Preliminary Search Report issued Apr. 20, 2012 in Patent Application No. FR 1159732 (with English translation of Categories of Cited Documents).

* cited by examiner

METHOD FOR BALANCING THE CHARGE AND DISCHARGE LEVEL OF A BATTERY BY SWITCHING ITS BLOCKS OF CELLS

The present invention relates to a method for balancing the level of charge of a battery by switching its blocks of cells. It is applicable notably, but not exclusively, to Lithium-ion (Li-ion) batteries powering the drive chain of electric or hybrid vehicles.

Owing to their high voltage and their high energy density, Li-ion batteries are particularly well adapted for powering the drive chain of an electric or hybrid vehicle. In such a battery, a Li-ion cell is an elementary component which contains a certain quantity of electrolyte, whether this be a solid or liquid electrolyte, through which ions of lithium can migrate between a cathode and an anode. In the charging phase of the battery, this migration of ions is the reason for the accumulation of an electrical charge in the cell. In the discharging phase of the battery, this migration of ions is the reason for an electrical current flowing between the cathode and the anode of the cell. In a Li-ion battery, a plurality of Li-ion cells are first of all assembled and connected in series and/or in parallel so as to form a block, then a plurality of blocks are assembled and connected in series and/or in parallel so as to form a 'pack', according to the standard terminology. An electronic control unit, commonly called "Battery Management System" (or BMS) according to the standard terminology, is connected to the pack so as to form a battery.

The role of the BMS is, amongst other things, to provide functions for balancing charges accumulated within the cells. Indeed, the levels of maximum charge and of maximum discharge for each cell must be controlled in order to best exploit the charge and discharge capacity of the battery: without balancing, the maximum level of charge of the battery would be limited to the level of charge of the cell first reaching its maximum charge and its maximum level of discharge would be limited to the level of charge of the cell first reaching its minimum charge. Thus, by optimizing the exploitation of the charge and discharge capacity of the battery, the balancing of the charge and discharge levels reduces the number of charge-discharge cycles, maximizes the lifetime of the battery, and enhances the autonomy available for one charge/discharge cycle. By avoiding overcharging, the overheating of the cells and potentially their destruction, the balancing of the charge and of the discharge also participates in the safety aspects of the vehicle.

Passive BMS systems do exist which, on the basis of measurements of local voltages across the terminals of each cell, balance the level of charge by dissipation of energy. This can consist in disposing resistances across the terminals of each cell in order to dissipate the energy. One major drawback of this type of system is that it does not allow balancing during the discharge. Another drawback of this type of system is that the energy dissipated via balancing currents in the resistances is lost. Another final drawback is that the currents for balancing are limited to around 10 to 100 mA in this type of system for heat limitation reasons, and hence the associated times for balancing may be long. This is a technical problem to which the present invention is to provide a solution.

Active BMS systems also exist which, again on the basis of measurements of the local voltages across the terminals of each cell, balance the charge by transfer of energy. For example, the international patent application WO 2004/049540 discloses an active BMS comprising devices for transferring energy from one cell to another within a block or from one block to another via balancing currents of a few amps (A). This active system enables balancing during charging but also during discharging and reduces the energy losses. Nevertheless, one major drawback of this system is that, since the blocks have references with different potentials, the transfers of energy between blocks are generally carried out by using isolated transformers of the 'flyback' type, which turn out to be costly, bulky and which greatly reduce the energy efficiency of the system. This represents another technical problem to which the present invention is to provide a solution.

One particular aim of the invention is to speed up the balancing and to exploit as much as possible the capacity of the blocks so as to increase the autonomy of the vehicle. For this purpose, one subject of the invention is a device for balancing the overall levels of electrical charge of a plurality of blocks of cells. The blocks are designed to be connected into a circuit during a charging phase, during which the cells of the connected blocks accumulate charge, and during a discharging phase during which the cells of the connected blocks return the charge in the form of electrical current. The device comprises at least one series switch and one parallel switch. The series switch is able, when it is in the closed position and when the parallel switch is in the open position, to connect a block into the circuit in series with the other blocks, such that said block is connected during the charging and discharging phases. The parallel switch is able, when it is in the closed position and when the series switch is in the open position, to remove said block from the circuit, such that said block is disconnected if discharging disconnection criteria are satisfied during the discharging phase or if charging disconnection criteria are satisfied during the charging phase, said block furthermore comprising means for locally balancing the levels of charge of its cells when it is disconnected.

Advantageously, the means for locally balancing the levels of charge of the cells of said block Bi can include means for measuring the voltages across the terminals of said cells, in such a manner as to deduce their level of charge. For example, these means for measuring the voltages across the terminals of the cells can include an integrated circuit comprising a plurality of voltage measurement channels.

In one embodiment, the means for locally balancing the levels of charge of the cells of said block can furthermore include means for dissipating the energy from the cells in a state of over-charge in said block.

In another embodiment, the means for locally balancing the levels of charge of the cells of said block can furthermore include means for transferring the energy from the cells in a state of over-charge to other cells of said block.

Advantageously, the discharging disconnection criteria for said block can include exceeding a limiting level of discharge of said block whenever the electrical current that it is returning is higher than a given threshold.

Advantageously, the discharging disconnection criteria for said block can include exceeding the maximum level of discharge of said block whenever the electrical current that it is returning is lower than a given threshold.

Advantageously, the charging disconnection criteria for said block can include exceeding a limiting level of charge of said block whenever the electrical charging current that is applied to it is higher than a given threshold.

Advantageously, the charging disconnection criteria for said block can include exceeding the maximum level of charge of said block whenever the electrical charging current that is applied to it is lower than a given threshold.

For example, the cells can be lithium-ion cells.

Another subject of the invention is a motive power battery for an electric or hybrid vehicle comprising such a device for balancing the overall levels of charge between its blocks of cells.

A further subject of the invention is an electric or hybrid vehicle comprising such a motive power battery.

Yet another subject of the present invention is a method for charging a battery according to the invention, the method being characterized in that it comprises successive charging phases with charging currents of decreasing intensity from one phase to the next, all the blocks not having a state of charge substantially equal to 100% being connected at the start of each phase. One block from amongst said blocks not having a state of charge substantially equal to 100% is disconnected temporarily until the start of the following phase if the voltage across its terminals has reached a predetermined maximum threshold, said threshold depending on the current intensity of the charging current. It is disconnected definitively until the end of the charging process if its state of charge has reached substantially 100%. The passage from the current phase to the following phase is triggered as soon as the number of blocks still connected reaches a predetermined minimum number in the range between 1 and the number of blocks which were connected at the start of current phase.

A further subject of the present invention is another method for charging a battery according to the invention, the method being characterized in that it comprises successive charging phases with charging currents of decreasing intensity from one phase to the next, the blocks with the least charge from amongst those not having a state of charge substantially equal to 100% being connected at the start of each phase. These blocks with the least charge are determined periodically at fixed and predetermined intervals of time. One block from amongst these blocks with the least charge is disconnected temporarily until the start of one of the later charging phases, if the voltage across its terminals has reached a predetermined maximum threshold, said threshold depending on the current intensity of the charging current. It is disconnected definitively until the end of the charging process if its state of charge has reached substantially 100%. The passage from the current phase to the following phase is triggered as soon as the number of blocks still connected reaches a predetermined minimum number in the range between 1 and the number of blocks which were connected at the start of current phase.

The main advantage of the present invention is to rapidly balance the level of charge between the blocks, which is particularly suited to fast charging methods.

It also allows a continuity of service to be ensured upon occurrence of a failure of a cell or of a part of a block, by isolation of the block.

The invention also allows the autonomy of the vehicle to be increased owing to the optimized use of the blocks forming the battery pack. Indeed, if one of the blocks has reached its maximum level of charge or of discharge, then the system allows it to be isolated in order to continue to operate on the other blocks.

The invention also allows the losses during a transfer of energy from one block to another to be limited, thus optimizing the energy efficiency of the BMS.

Figure 2:
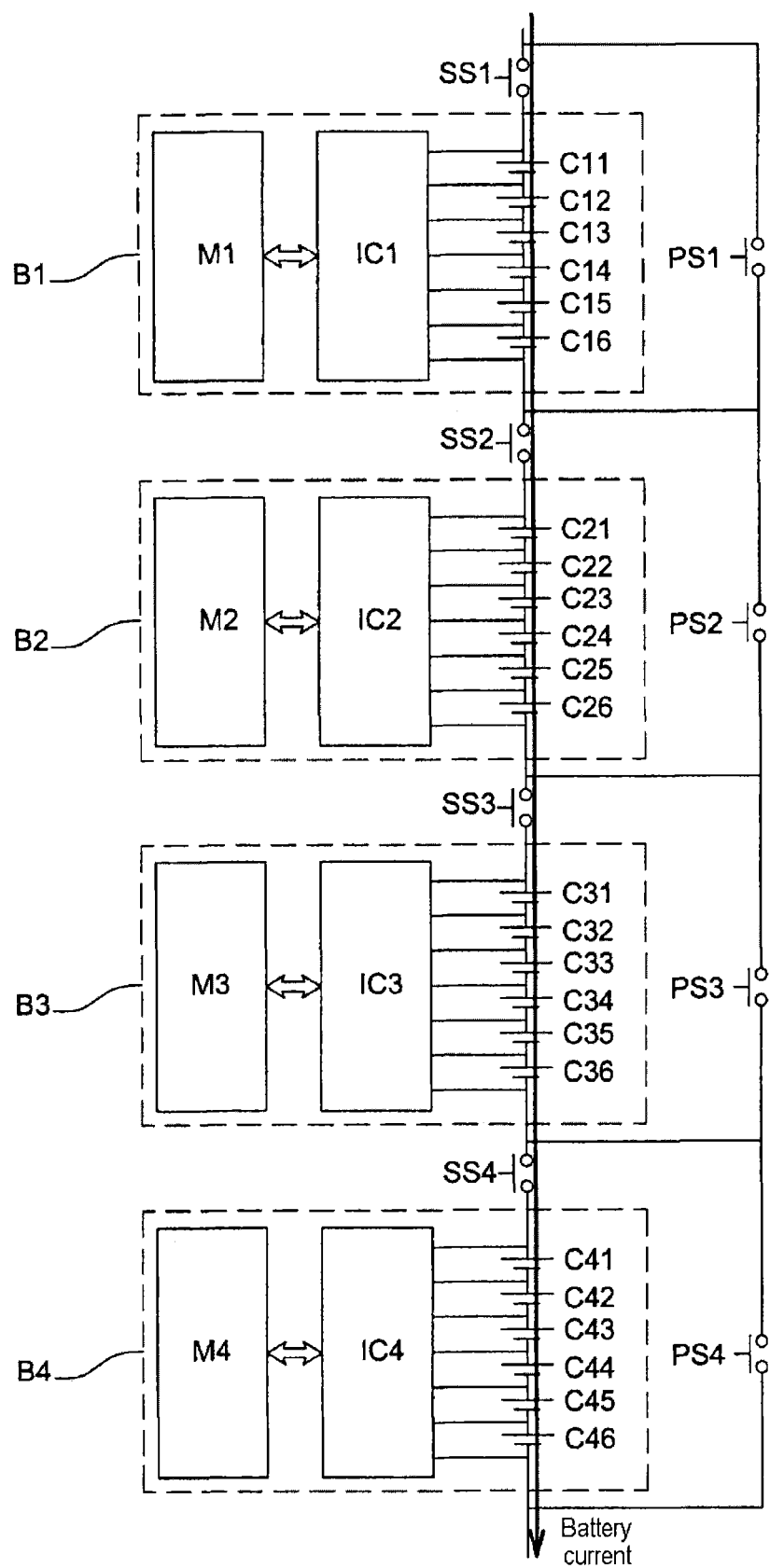
Figure 3:
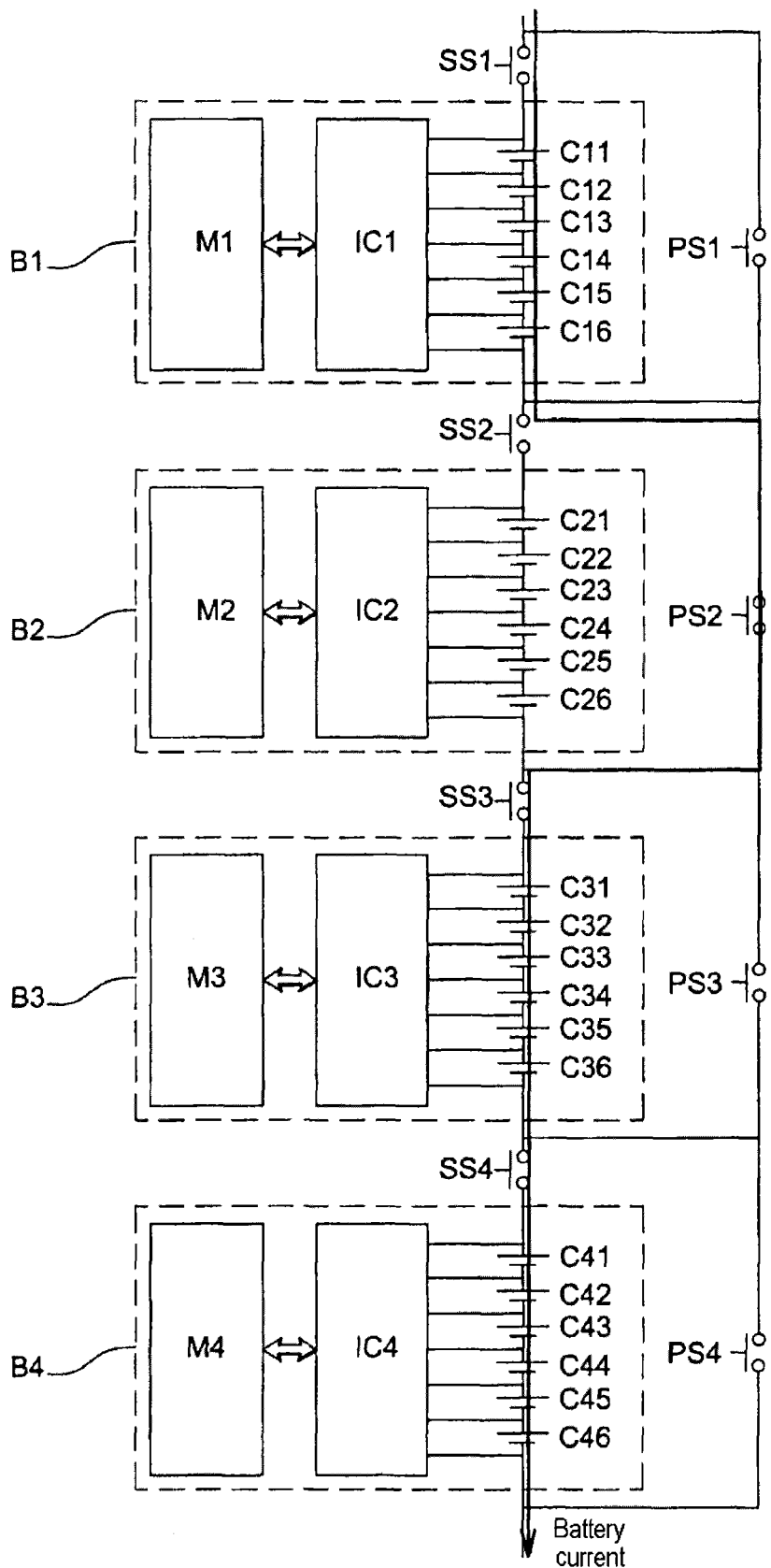

Other features and advantages of the invention will become apparent with the aid of the description that follows, presented with regard to the appended figures, which illustrate:

FIG. 1, with a schematic diagram, one example of a battery pack according to the invention;

FIG. 2, with a schematic diagram, one exemplary configuration of a pack according to the invention where all the blocks are connected;

FIG. 3, with a schematic diagram, one exemplary configuration of a pack according to the invention where only one block is disconnected;

FIGS. 4 to 9 which illustrate, by graphs, examples of fast charging methods that can be implemented in a battery pack according to the invention.

FIG. 1 illustrates with a schematic diagram one example of a battery pack according to the invention for an electric or hybrid vehicle. The pack illustrated comprises N blocks Bi with $1 \leq i \leq N-1$ and $N>6$ in the example illustrated, only four blocks of which referenced B1, B2, B3 and B4 are shown in FIG. 1. Each of the blocks B1, B2, B3 and B4 comprises six Li-ion cells connected in series, referenced C11, C12, C13, C14, C15 and C16 in the block B1, referenced C21, C22, C23, C24, C25 and C26 in the block B2, referenced C31, C32, C33, C34, C35 and C36 in the block B3 and referenced C41, C42, C43, C44, C45 and C46 in the block B4. Each of the blocks B1, B2, B3 and B4 furthermore comprises an integrated circuit for measuring the voltage across the terminals of each of the cells internal to the block, these circuits being referenced IC1, IC2, IC3 and IC4, respectively. Each of the circuits IC1, IC2, IC3 and IC4 being able to measure between 6 and 16 cell voltages in the present non-limiting example, of which only 6 measured cell voltages are shown in FIG. 1, the circuit IC1 can advantageously measure the voltage across the terminals of each of the cells C11, C12, C13, C14, C15 and C16 in the block B1, the circuit IC2 can advantageously measure the voltage across the terminals of each of the cells C21, C22, C23, C24, C25 and C26 in the block B2, the circuit IC3 can advantageously measure the voltage across the terminals of each of the cells C31, C32, C33, C34, C35 and C36 in the block B3, the circuit IC4 can advantageously measure the voltage across the terminals of each of the cells C41, C42, C43, C44, C45 and C46 in the block B4. Each of the blocks B1, B2, B3 and B4 furthermore comprises a module for local balancing referenced M1, M2, M3 and M4, respectively. The module M1 advantageously allows the charge between the cells C11, C12, C13, C14, C15 and C16 in the block B1 to be balanced using the voltage measurements which are supplied to it by the circuit IC1. The module M2 advantageously allows the charge between the cells C21, C22, C23, C24, C25 and C26 in the block B2 to be balanced using the voltage measurements which are supplied to it by the circuit IC2. The module M3 advantageously allows the charge between the cells C31, C32, C33, C34, C35 and C36 in the block B3 to be balanced using the voltage measurements which are supplied to it by the circuit IC3. The module M4 advantageously allows the charge between the cells C41, C42, C43, C44, C45 and C46 in the block B4 to be balanced using the voltage measurements which are supplied to it by the circuit IC4. It should be noted that, without straying from the principles of the present invention, the local balancing modules M1, M2, M3 and M4 can just as easily implement either solutions for passive balancing by dissipation of energy or solutions for active balancing by transfer of energy. Indeed, the idea of the invention is to combine local balancing, whether it be active or passive, with switching of blocks.

In the present exemplary embodiment in FIG. 1, the block switching is advantageously provided by switches which allow the N blocks of the pack to be connected together in an optimal manner. On the one hand, switches allow all or part of the N blocks of the pack to be connected in series. For example, a switch SS1 in the closed position allows the negative pole of a block B0—not shown in FIG. 1—to be connected to the positive pole of the block B1; a switch SS2 in the closed position allows the negative pole of the block B1 to be connected to the positive pole of the block B2; a switch SS3 in the closed position allows the negative pole of the block B2 to be connected to the positive pole of the block B3; and a switch SS4 in the closed position allows the negative pole of the block B3 to be connected to the positive pole of the block B4. A switch in the closed position—not shown in FIG. 1—also allows the negative pole of the block B4 to be connected to the positive pole of a block B5—not shown in FIG. 1. For the sake of clarity, the switches SSi ($0<i\leq N-1$) will sometimes be referred to as "series switches" in the following part of the present application. On the other hand, switches assembled in parallel with the N blocks of the pack allow, in combination with the series switches, all or part of the N blocks of the pack to be selectively disconnected. For example, a switch PS1 is assembled in parallel with the block B1 in such a manner that the block B1 is disconnected from the pack when the switch SS1 is in the open position and the switch PS1 is in the closed position, the block B1 only being connected to the pack when the switch SS1 is in the closed position and the switch PS1 is in the open position. A switch PS2 is assembled in parallel with the block B2 in such a manner that the block B2 is disconnected from the pack when the switch SS2 is in the open position and the switch PS2 is in the closed position, the block B2 only being connected to the pack when the switch SS2 is in the closed position and the switch PS2 is in the open position. A switch PS3 is assembled in parallel with the block B3 in such a manner that the block B3 is disconnected from the pack when the switch SS3 is in the open position and the switch PS3 is in the closed position, the block B3 only being connected to the pack when the switch SS3 is in the closed position and the switch PS3 is in the open position. A switch PS4 is assembled in parallel with the block B4 in such a manner that the block B4 is disconnected from the pack when the switch SS4 is in the open position and the switch PS4 is in the closed position, the block B4 only being connected to the pack when the switch SS4 is in the closed position and the switch PS4 is in the open position. For the sake of clarity, the switches PSi ($0<i\leq N-1$) will sometimes be referred to as "parallel switches" in the following part of the present application. The switches are controlled in such a manner that the series switch SSi ($0<i\leq N-1$) is in the open position when the parallel switch PSi is in the closed position and vice versa. For example, FIG. 2 illustrates the configuration where all the modules B1, B2, B3 and B4 are connected. In the example in FIG. 3, the modules B1, B3 and B4 are connected, only the module B2 is disconnected. This controlling in opposition of a series switch and a parallel switch, the one being in the open position when the other is in the closed position and vice versa, is provided by a control system, not shown in FIG. 1, which generates control commands for the switches based on information received on the state of the vehicle. This control system may for example include an intelligence hosted by an electronic circuit such as a microcontroller, this microcontroller also being able to be linked with other systems such as the BMS or a vehicle supervisor. This control system may also comprise 'drivers', which are electronic components that control the switches according to the command received from the intelligence.

In charging mode, for example when the vehicle is connected to a charger or in the course of recuperative braking, several charging phases can be identified in the same charging cycle. In a first charging phase, all the series switches SSi ($0<i\leq N-1$) are in the closed position and all the parallel switches PSi ($0<i\leq N-1$) are in the open position as in the example in FIG. 2: all the blocks Bi ($0<i\leq N-1$) of the pack are then connected and are being recharged. This recharging is not uniform for all the blocks Bi ($0<i\leq N-1$) because the latter do not all exhibit the same characteristics and do not all have the same temperature. In a second charging phase, the block or blocks having reached their limiting level of charge under a high current (e.g. in fast charging mode) may be disconnected by opening their series switch and by closing their parallel switch. This limiting level of charge under a high current can be 70 to 80% of the maximum level of charge depending on the internal resistances of the cells. In the example in FIG. 3, it is the block B2 which is disconnected by opening the series switch SS2 and by closing the parallel switch PS2. It should be noted that, because of the internal resistances of the cells, this limiting level of charge under a high current is not the maximum level of charge attainable. The disconnected blocks are no longer recharged but can continue their local balancing; the other blocks having remained connected continue their charging. In a third charging phase, the block or blocks previously disconnected can be reconnected to the pack by opening their parallel switch and by closing their series switch in order to continue their charging under a less intense current, by progressively decreasing the charging current so as to reach a higher level of charge, by dichotomy with the intensity of the charging current for example. For example, when the battery allows it, the initial current can be a high current of the order of 100 A until a level of charge of the order of 80% is reached. When the blocks have almost all reached this level, for example when more than 50% of the blocks have reached this level, the process can continue with a lower current of the order of 50 A until a level of charge of the order of 90%. The process can subsequently continue with 25 A and so on, the process being interrupted depending on the time available for recharging. This cycle can be repeated until the maximum complete charging of the pack or just before this. This mode of operation can be used both in fast charging mode and/or in normal charging mode. It must be clearly understood that the values of current given hereinabove are given by way of non-limiting example, since they depend on the size of the battery, on the internal resistance of the battery and potentially even on its temperature which has a significant influence on its internal resistance.

In discharging mode, for example when the vehicle is being driven, several charging phases may also be identified in the same discharging cycle. In a first discharging phase, all the series switches are in the closed position and all the parallel switches are in the open position, as in the example in FIG. 2: all the blocks Bi ($0<i\leq N-1$) of the pack are then connected and being discharged. This discharging is not uniform for all the blocks because the latter do not all exhibit the same characteristics and do not all have the same temperature. In a second discharging phase, the block or blocks having reached their limiting level of discharge, notably under a high current (higher than 50-100 A depending on the internal resistances of the cells), may be disconnected by opening their series switch and by closing their parallel switch. In the example in FIG. 3, it is the block B2 which is disconnected by opening the series switch SS2 and by closing the parallel switch PS2. The disconnected blocks are no longer discharged, whereas the other blocks remaining connected continue to be discharged. It should be noted that, owing to the internal resistances of the cells, this limiting level of discharge under a high current is not the maximum level of discharge attainable, which can be of the order of 20% of the limiting level of discharge under a high current. In a third discharging phase, the block or blocks previously disconnected can be reconnected to the pack by opening their parallel switch and by closing their series switch in order to continue their discharging under a lower current. This cycle may be repeated until the maximum complete discharge of the pack.

The switches, whether these be series switches SSi or parallel switches PSi, may be field-effect transistors, better known by the acronym MOSFET, since they offer multiple advantages in the present exemplary embodiment. First of all, MOSFETs have a low resistance in the conducting state, in other words in the closed position, this resistance being able to go down as far as 0.7 milli-ohms, in one non-limiting example according to the current prior art, typically for a maximum operating voltage of 40 V and a maximum rated current of the order of about a hundred amps. In order to further reduce the losses, each MOSFET may advantageously be replaced by several MOSFETs in parallel, MOSFETs being easily connectable in parallel since they have a positive temperature coefficient. Connecting the MOSFETs in parallel allows the current to be divided between the MOSFETs and to make their use, with the losses under control, compatible with the intensity of the currents for balancing one block to another which can go up to several hundreds of amps in the case of a motive power battery for an electric or hybrid vehicle. Moreover, since they are field-effect components, MOSFETs need very little energy for controlling the switching between the conducting state and the off state. Finally, MOSFETs are components that are already widely used within the automobile industry.

The dimensions of the power circuit, which notably includes the series and parallel switches, are so as to be compatible with currents for balancing one block to another of several hundreds of amps. The power circuit can be fabricated within an isolated metal substrate or, for a lower-cost system, on a multilayer PCB (Printed Circuit Board). Advantageously, it can be fabricated in such a manner as to simplify as far as possible the assembly and the mechanical separation of the blocks from one another. In one particularly integrated embodiment, a complete block can comprise the cells, the circuit for measuring the voltages, the module for local balancing together with, on the same board, the power circuit including the series and parallel switches and the control system for these switches. A communications link connecting the blocks together and with the other systems of the vehicle allows information on the state of the vehicle to be collected based on which the control system deduces its control commands to be sent to the series and parallel switches. Despite this high level of integration, the mass of such an integrated block can be less than 20 kilograms, a fact which facilitates its handling by a maintenance technician.

A further main advantage of the invention is that it contributes to the safety of the service personnel by limiting to the voltage of a single block the maximum voltage to which a maintenance technician can be subjected, and all the switches can be opened automatically in the case of an accident or even each time that the vehicle is stopped. For this purpose, the voltage across the terminals of each block can be chosen to have a value lower than a 'safe' voltage of 60 volts, eight to twelve blocks then being sufficient to reach a voltage of 400 volts across the terminals of the battery, such a voltage being adapted to the requirements of an electric or hybrid vehicle.

Moreover, the invention makes the battery pack configurable into or out of which each of the blocks can be easily connected or disconnected. This configurability simplifies the installation and removal operations for a block of the pack and permits the combination of blocks of various technologies within the pack, following the failure of a block for example. This configurability also enables a more flexible mechanical integration of the pack into the vehicle, since the blocks of the battery may be distributed in such a manner as to optimize the space in the passenger compartment or in the trunk. This configurability allows the blocks and the pack which receives them to be standardized, this pack being able to accept a variable number of blocks according to the model range of the vehicle and to the expected autonomy within this model range, and consequently allows the costs of development and of logistics to be reduced.

By appropriately adjusting its charging disconnection criteria, the device according to the present invention allows advantageous methods for fast charging to be implemented.

In order to understand the principle of a first fast charging method, it may be imagined that the battery pack illustrated in FIGS. 1 to 3 is connected to a fast charger delivering a high charging power of the order of 43 kilowatts for example. At the start of charging, all the blocks, in other words the N blocks including B1 to B4, may be connected, as illustrated in FIG. 2. The N blocks are therefore recharged simultaneously. Depending on the characteristics of the charger and of the battery, the charger can for example limit the current to 100 A for a charge of 43 kW. When a block from amongst the N blocks reaches its maximum admissible voltage limit, for example 25.2 volts, if it is considered that each of the N blocks comprises 6 cells connected in series and each allowing a maximum voltage of 4.2 volts, said block can be disconnected and the charging can continue for the other blocks remaining connected under the same current of 100 A, and so forth, the number of blocks connected decreasing progressively by decrements of 1. When the number of blocks connected becomes less than a number M where 1<M<N, the charger reduces the charging current and all the N blocks are reconnected, so as to continue the charging under a reduced regime of less than 100 A. Then, the same process is reiterated. When one of the N blocks becomes completely charged, it is definitively disconnected, whereas the N−1 other blocks continue with the iterative charging process. It therefore turns out that two criteria are decisive for the disconnection of a block:

a first criterion for temporary disconnection, in other words for disconnection as long as the charging current is not reduced, which is satisfied if the voltage across the terminals of the block reaches its maximum value; this is the voltage under load, in other words when a current is applied to its terminals;

a second criterion for definitive disconnection, which is satisfied if the charging of the block is finished, in other words if it has reached a state of charge, or an "SOC", of the order of 100%.

In order to better understand how this first fast charging method can be implemented in a device according to the present invention, FIGS. 4 to 7 illustrate the variation of the SOC (varying between 0 and 100% on the left-hand ordinate) as a function of the charging time (on the abscissa) and as a function of the charging current (varying between 100 A and 0 A on the right-hand ordinate) for the N blocks of cells in the particular case where N=8. Unless otherwise stated, the charging power is of the order of 43 kW in the examples that follow.

Figure 4:
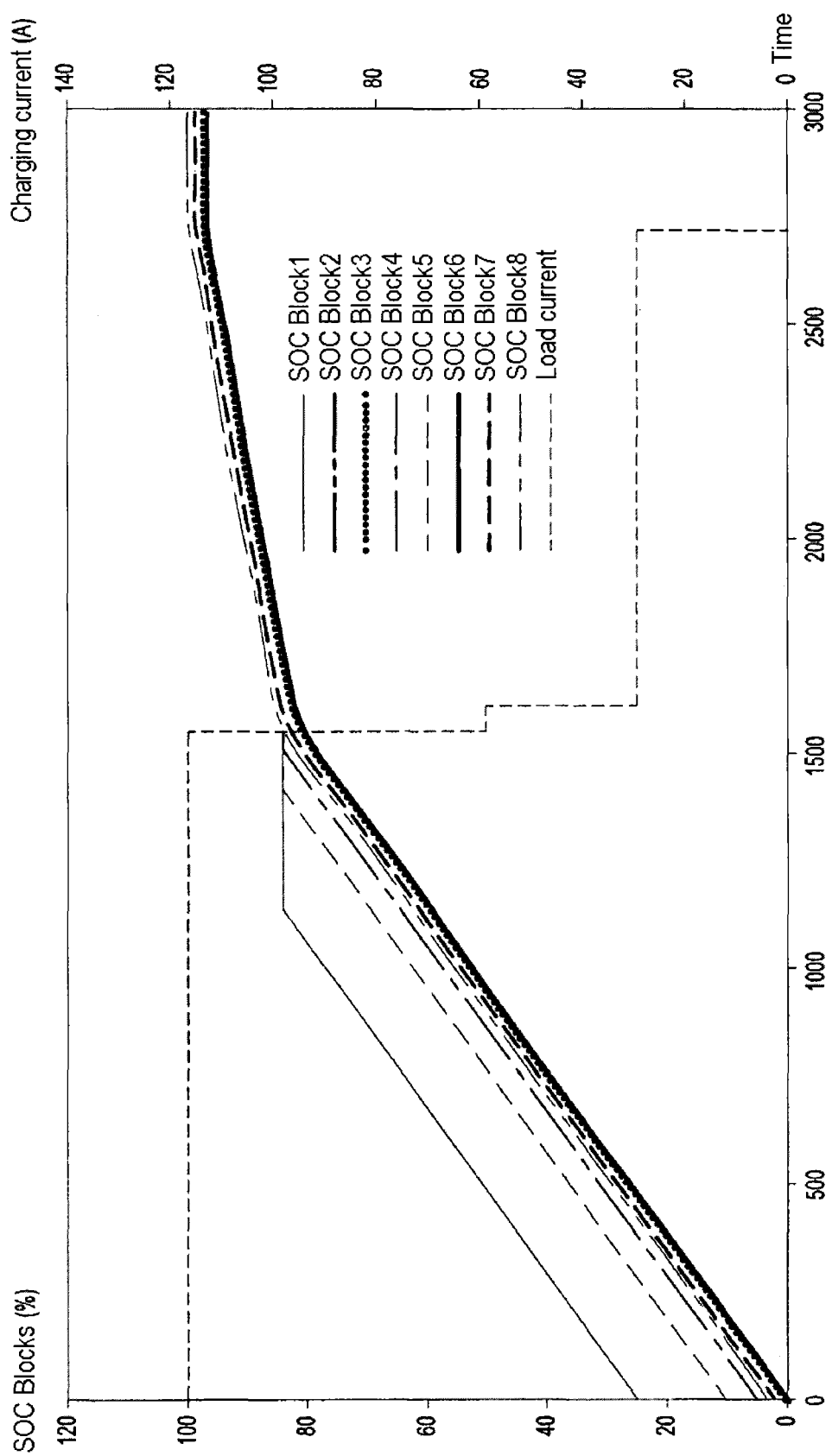

In a first exemplary embodiment illustrated in FIG. 4, the minimum number of connected blocks has been fixed at 4, this value corresponding to the minimum voltage admissible by the charger. In this exemplary embodiment, the current can be reduced by a factor 2 each time that one of the disconnection criteria previously described is satisfied. It turns out that the charging is divided into two separate phases: a charging phase with maximum current at 100 A and for balancing the blocks with the most charge, this phase allowing a state of charge of the order of 84% to be very rapidly reached depending on the characteristics of the electrochemical cells and on the charging current, then an end of charging phase at a reduced current below 60 A, the state of charge then varying more slowly from 84% to 100%. It may be noted that the most unbalanced blocks, namely the blocks 1, 2 and 4, are rebalanced following this method during the first phase of operation at maximum current allowing a first plateau at substantially 84% of SOC for the 8 blocks to be reached. Whereas the least unbalanced blocks, namely the blocks 3, 5, 6, 7 and 8, remain unbalanced until the end of the charging process.

Figure 5:
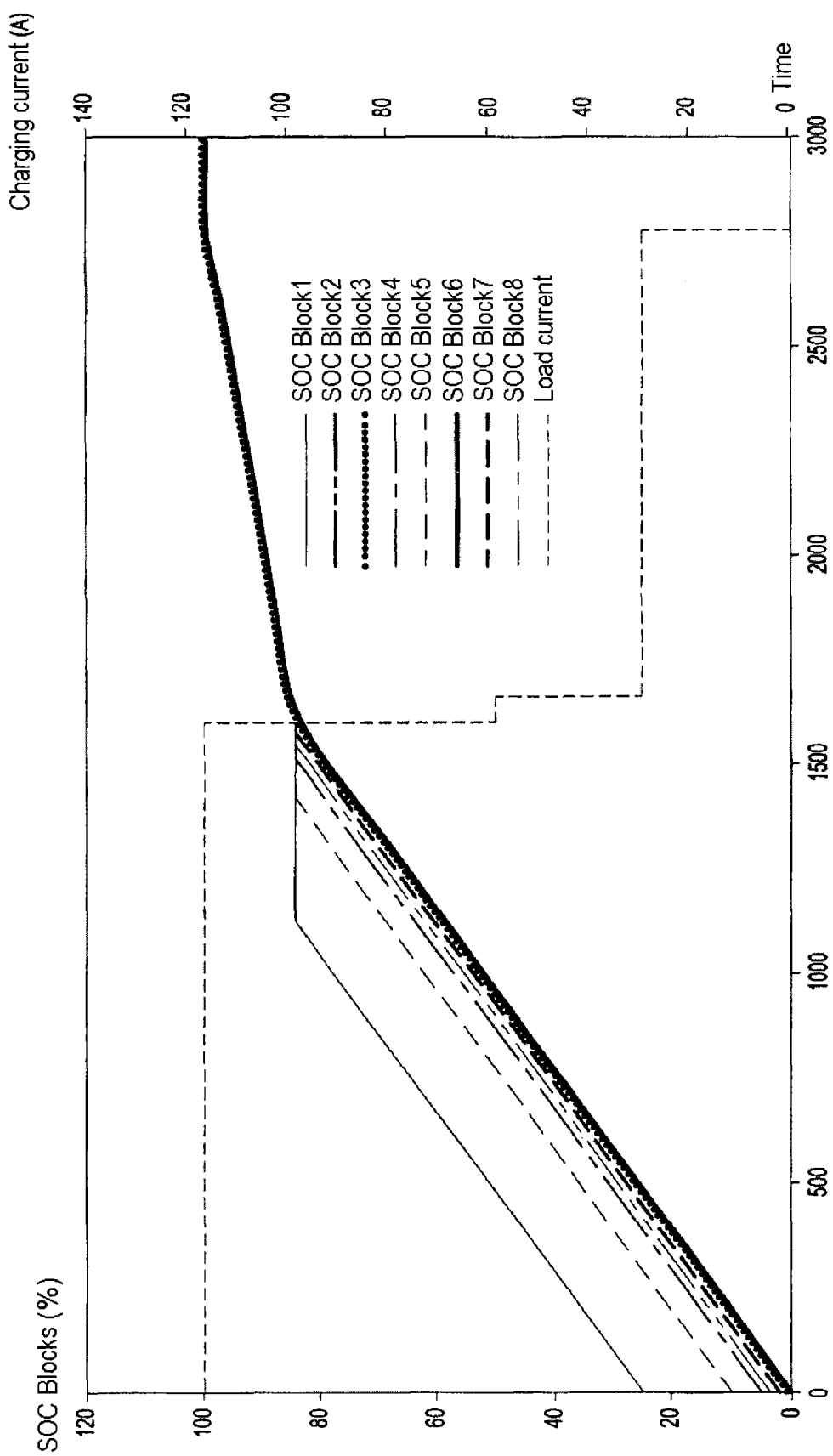

In another exemplary embodiment illustrated in FIG. 5, the same parameters have been applied as in the example in FIG. 4, except for the minimum number of connected blocks which has been fixed at 1. As can be observed, all the blocks are balanced at the end of the first charging phase at maximum current. From this, it may be concluded that, in order to obtain a fast rebalancing of good quality, the number of blocks connected during recharging need to be able to be reduced as much as possible and ideally to be able to operate with only 1 block connected. However, for this, the charger needs to be adapted to this mode of operation, notably in terms of minimum admissible voltage.

Figure 6:
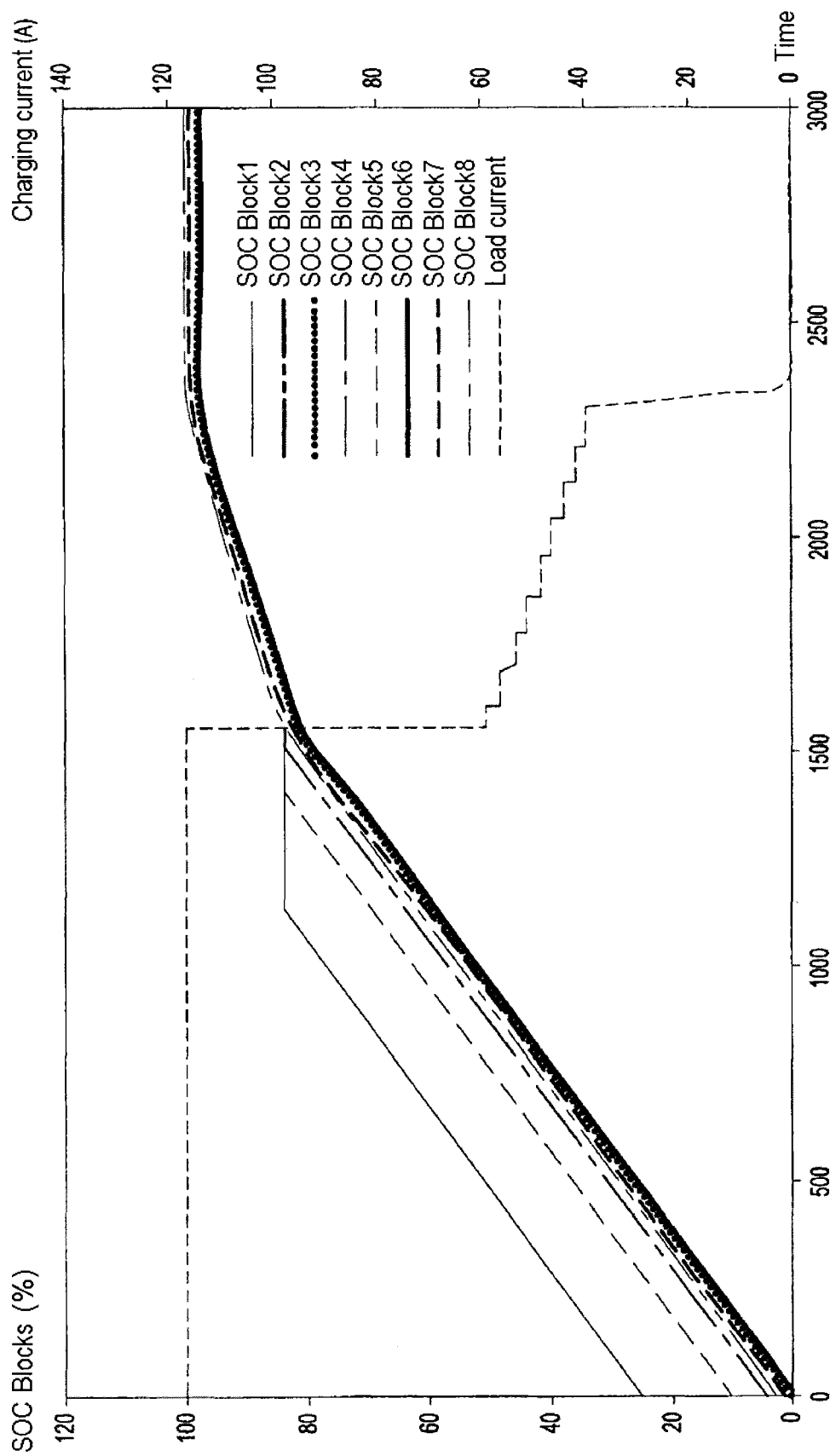

In another exemplary embodiment illustrated in FIG. 6, the same parameters have been applied as in the example in FIG. 4, except for the current reduction coefficient which goes from 2 to 1.05. Indeed, although this is not very explicit in FIG. 6, just after the end of the charging at 100 A, this reduction coefficient of 1.05 is applied several times successively very rapidly, in order for the current to be sufficiently reduced and for the charging of the blocks to be carried out without the maximum voltage being reached. As can be seen by comparing the examples in FIGS. 4 and 6, the nearer this reduction coefficient is to 1, the faster the complete charge is reached, even if, as a result, the number of switching operations of the blocks increase significantly. The idea is therefore to find the best compromise between the finesse in reduction of the charging current and the maximum number of switching operations admissible, for questions of reliability for example. As can be observed, the second phase is much shorter, since complete charging at 100% of state of charge is reached after substantially 2300 seconds instead of 2700 seconds. With this fast charging method, for a battery of 62 Ah, an SOC of 84% in 1500 s is obtained with a rebalancing of the M' blocks with the most charge, where M'≥1 is an integer. The number M' depends on the capacity of the charger to operate with a low voltage. The value of 84%, on the other hand, is limited by the internal resistances of the electrochemical cells. A complete charge at 100% of SOC (when the charging current is zero) is obtained with no improvement in the balancing obtained previously, with a complementary charge of 800 seconds.

Figure 7:
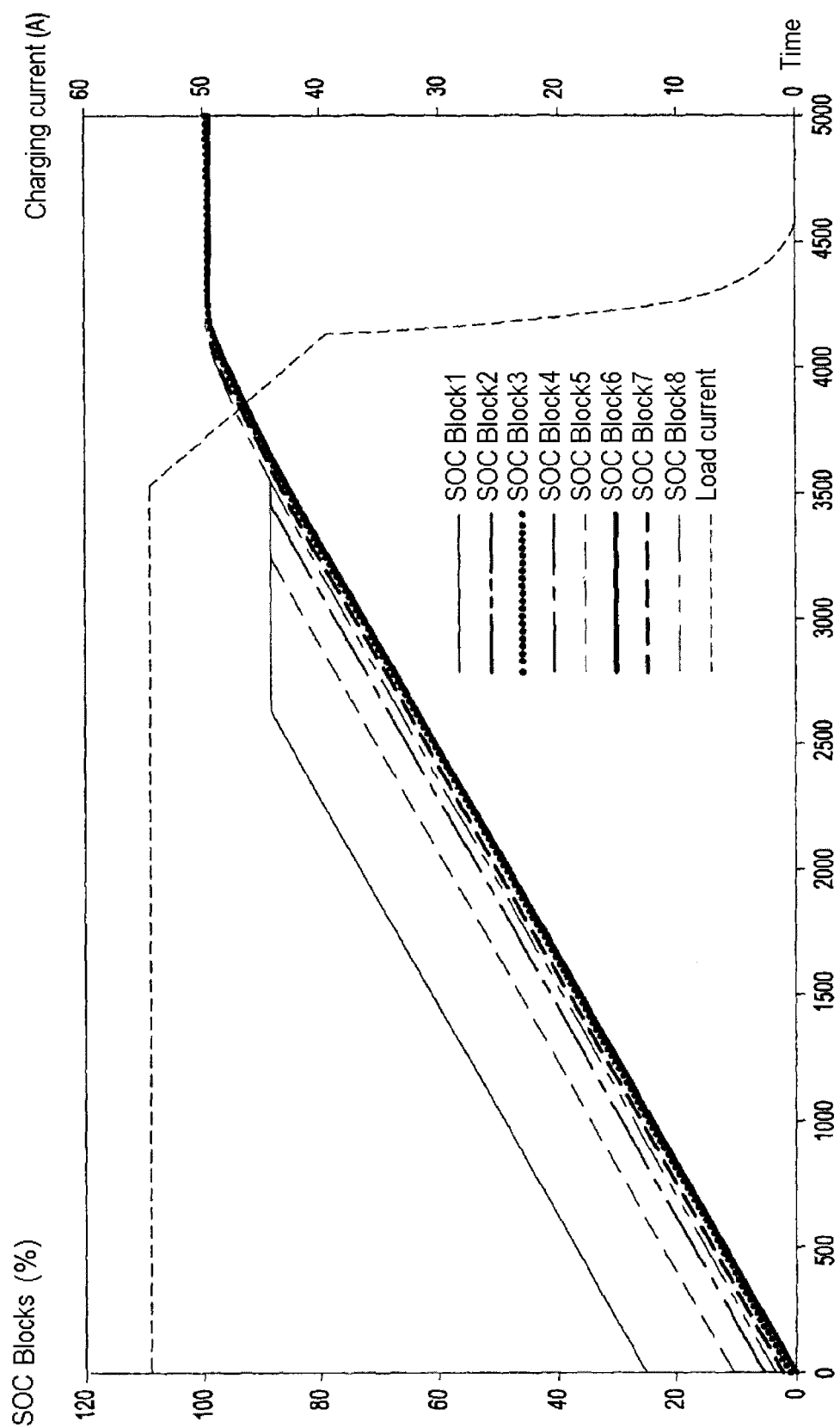

In another exemplary embodiment illustrated in FIG. 7, the charging power is lower, namely 20 kW instead of 43 kW, with a reduction coefficient equal to 1.1. This only impacts the first phase of charging by increasing its duration to 3500 s instead of 1500 s. This duration is lengthened according to the ratio 43 kW/20 kW=2.15, to which a small amount of time is added, the final SOC being 90% instead of 84%. Indeed, since the current is lower, the first phase can be a bit longer.

Figure 8:
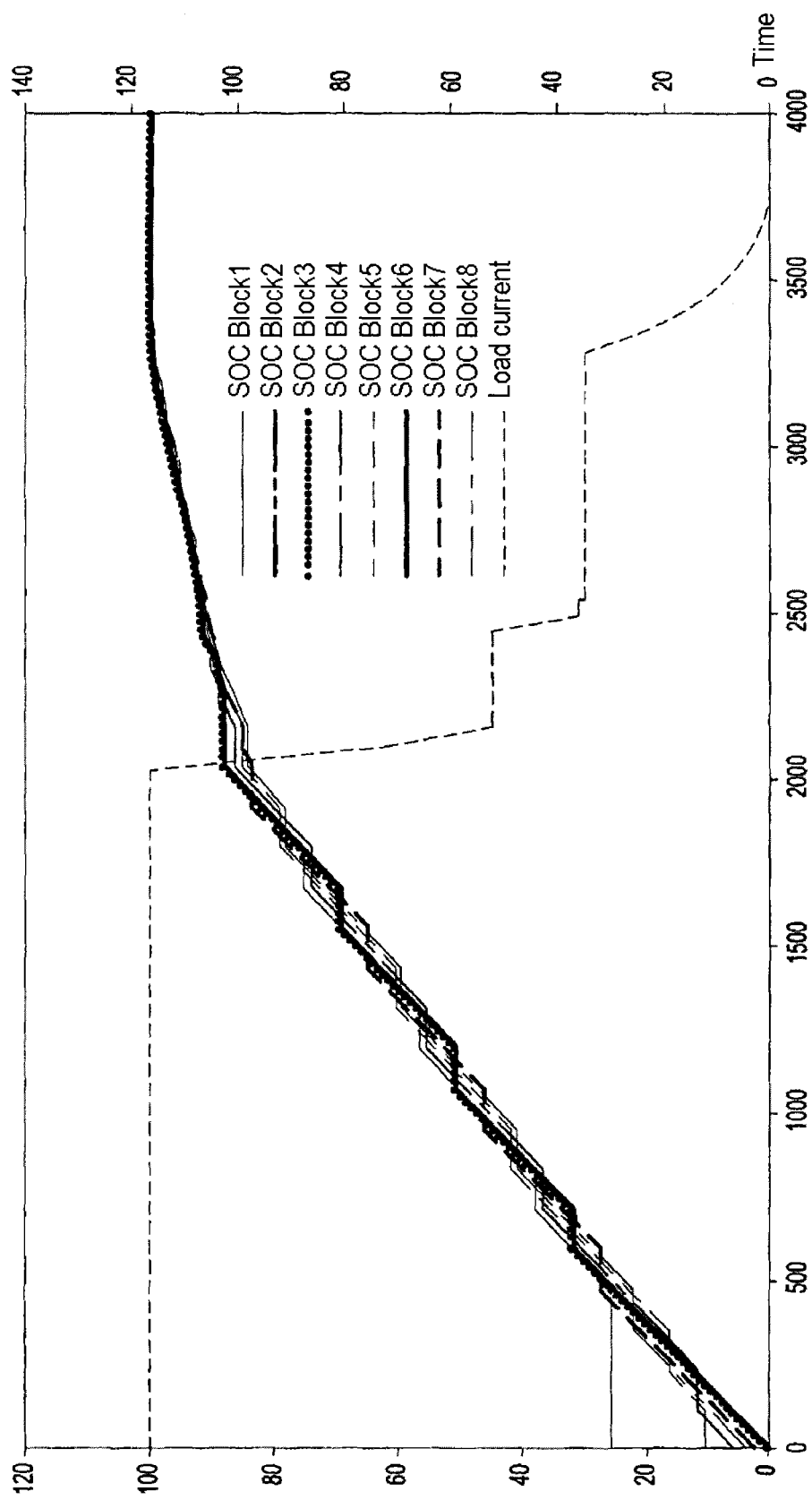
Figure 9:
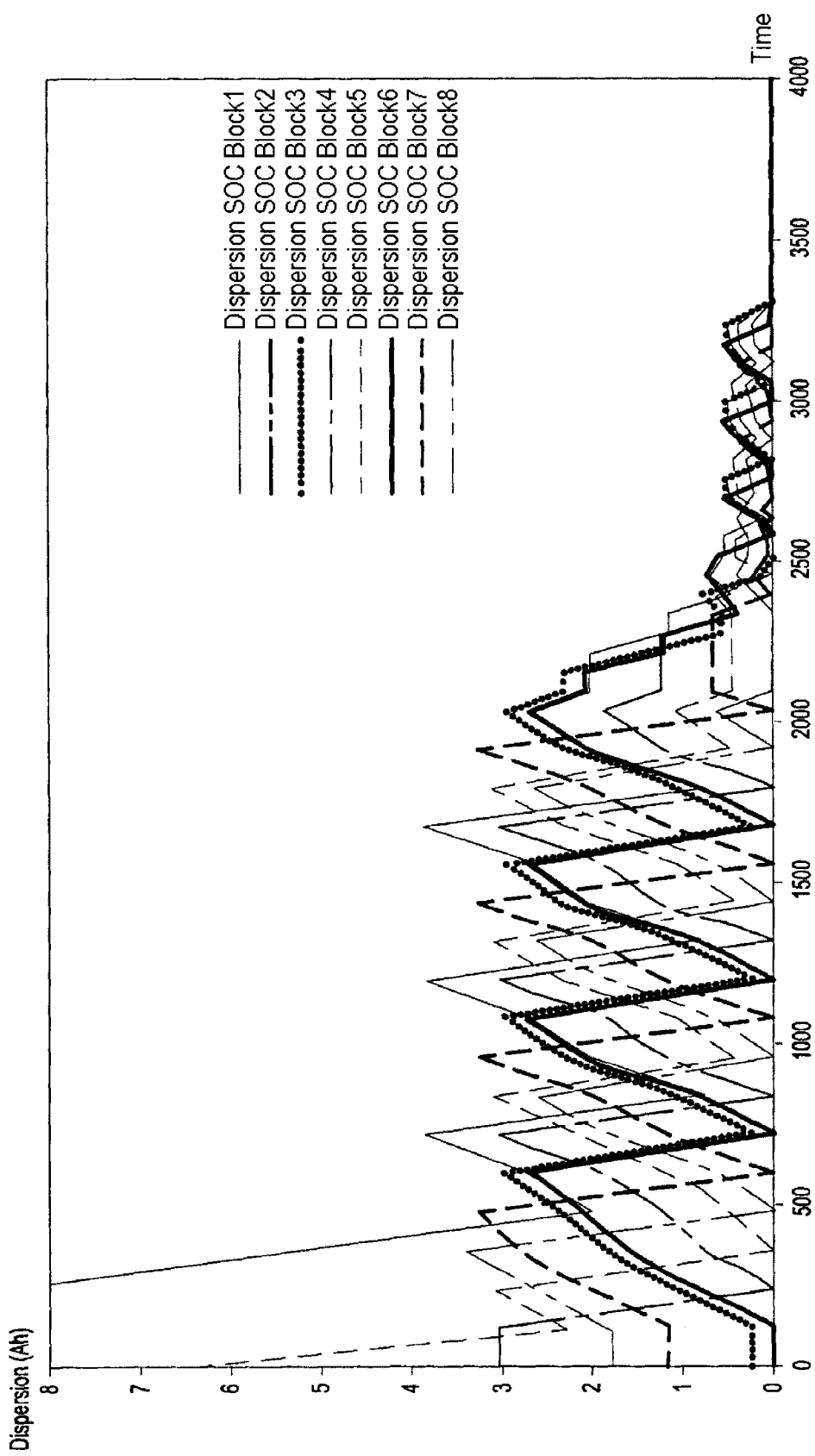

The fast charging method illustrated in FIGS. 4 to 7 can be improved: a second fast charging method can be to balance in a first step the M" blocks with the least charge, where M">1 is integer, by connecting only these M" blocks there. Then, the state of charge of the blocks is periodically recalculated and the M" blocks with the least charge are once again connected. As previously, when the voltage across the terminals of a block under the charging current exceeds its maximum admissible voltage, or when a block reaches a level of charge equal to 100%, it is disconnected. When the number of connectable blocks at a given moment is less than the number M, the charging current is reduced until the number of connectable blocks is compatible with the minimum operating voltage of the charger, or until the charging current is zero, which means that the charging is finished. Thus, FIG. 8 illustrates, in a representation system identical to that of FIGS. 4 to 7, one exemplary embodiment of this second fast charging method under conditions similar to the examples illustrated for the first method: N=8 blocks in total, charging power equal to 43 kWh, M"=6 blocks connected simultaneously, reduction coefficient for the charging current equal to 1.5, periodic recalculation of the states of charge every 120 seconds. FIG. 9 illustrates the dispersion between the blocks in amp-hours (Ah) as a function of the charging time. It can be seen that the dispersion is very rapidly reduced with respect to the first method illustrated in FIGS. 4 to 7. The downside is that the charging time increases slightly: the first phase at maximum power lasts 2000 seconds instead of 1600 seconds with the first method, the end of charging being reached after 3300 seconds instead of 2300 to 2500 seconds with the first method. However, with this second method, for a 62 Ah battery, an acceptable balancing of the blocks is quickly achieved, the dispersion being reduced to around 3 Ah between the blocks. This is particularly advantageous in the case where it were chosen to interrupt the charging before it is complete, even if this improvement in the balancing is carried out to the detriment of the charging time. However, it is possible to reduce these charging times by implementing a compromise between the two fast charging methods: a phase for balancing according to the second method, followed by a complete charging phase according to the first method.

The invention claimed is:

1. A device for balancing overall levels of electrical charge of N blocks of cells, where N>2, the N blocks configured to be connected into a circuit during a charging phase during which cells of the connected blocks accumulate charge and during a discharging phase during which the cells of the connected blocks return the charge in a form of electrical current, the device comprising:
   at least one switch $SS_i$ and one switch $PS_i$ where $0 < i \leq N-1$,
   wherein:
      the switch $SS_i$ is configured, when in a closed position and when the switch $PS_i$ is in an open position, to connect a block $B_i$ into the circuit in series with other blocks, such that the block $B_i$ is connected during the charging and discharging phases,
      the switch $PS_i$ is configured, when in the closed position and when the switch $SS_i$ is in the open position, to remove the block Bi from the circuit, such that the block Bi is disconnected if discharging disconnection criteria are satisfied during the discharging phase or if charging disconnection criteria are satisfied during the charging phase, the block Bi locally balances levels of charge of its cells when the block Bi is disconnected, and the discharging disconnection criteria for the block Bi include exceeding a limiting level of discharge of the block Bi whenever an electrical current that the block Bi is returning is higher than a given threshold.

2. The device as claimed in claim 1, further comprising: an integrated circuit having a plurality of voltage measurement channels.

3. The device as claimed in claim 2, wherein the integrated circuit measures voltages across the terminals of the cells to locally balance the levels of charge of the cells of the block Bi by deducing their level of charge.

4. The device as claimed in claim 1, wherein the locally balancing the levels of charge of the cells of the block Bi further includes dissipating energy from the cells in a state of over-charge in said block.

5. The device as claimed in claim 1, wherein the locally balancing the levels of charge of the cells of the block Bi further includes transferring energy from the cells in a state of over-charge to other cells of the block.

6. The device as claimed in claim 1, wherein the discharging disconnection criteria for the block Bi include exceeding a maximum level of discharge of the block Bi whenever an electrical current that the block Bi is returning is lower than a given threshold.

7. The device as claimed in claim 1, wherein the charging disconnection criteria for the block Bi include exceeding a limiting level of charge of the block Bi whenever an electrical charging current that is applied to the block Bi is higher than a given threshold.

8. The device as claimed in claim 1, wherein the charging disconnection criteria for the block Bi include exceeding a maximum level of charge of the block Bi whenever an electrical charging current that is applied to the block Bi is lower than a given threshold.

9. The device as claimed in claim 1, wherein the cells are lithium-ion cells.

10. A motive power battery for an electric or hybrid vehicle, comprising:
a device as claimed in claim 1.

11. An electric or hybrid vehicle, comprising:
a motive power battery as claimed in claim 10.

12. A method for charging a battery as claimed in claim 10, the method comprising:
successive charging phases with charging currents of decreasing intensity from one phase to the next, all the blocks not having a state of charge substantially equal to 100% being connected at a start of each phase, one block Bi from amongst the blocks not having a state of charge substantially equal to 100% being disconnected:
temporarily until a start of a following phase if the voltage across its terminals has reached a predetermined maximum threshold, the threshold depending on a current intensity of the charging current;
definitively until an end of the charging process if its state of charge has reached substantially 100%;
passage from the current phase to the following phase being triggered as soon as a number of blocks still connected reaches a predetermined minimum number M, where M is in a range between 1 and a number of blocks which were connected at a start of current phase.

13. A method for charging a battery as claimed in claim 10, comprising;
successive charging phases with charging currents of decreasing intensity from one phase to the next, M" blocks with a least charge from amongst those not having a state of charge substantially equal to 100% being connected at a start of each phase, where $1<M"<N$, the M" blocks being determined periodically at fixed and predetermined intervals of time, one block Bi from amongst these M" blocks being disconnected:
temporarily until a start of one of later charging phases, if a voltage across its terminals has reached a predetermined maximum threshold, the threshold depending on a current intensity of the charging current:
definitively until an end of the charging process if its state of charge has reached substantially 100%;
passage from the current phase to the following phase being triggered as soon as a number of blocks still connected reaches a predetermined minimum number M, where M is in a range between 1 and a number of blocks which were connected at a start of current phase.

* * * * *